June 7, 1927.

J. GOUGH 1,631,198

LEAF SEPARATOR

Filed Jan. 30, 1923

INVENTOR
Joseph Gough
BY
ATTORNEYS.

Patented June 7, 1927.

1,631,198

UNITED STATES PATENT OFFICE.

JOSEPH GOUGH, OF NEWARK, NEW JERSEY, ASSIGNOR TO GOUGH STEMMING MACHINE CORPORATION, A CORPORATION OF NEW JERSEY.

LEAF SEPARATOR.

Application filed January 30, 1923. Serial No. 615,826.

My invention relates to breaking up of bundles of dried leaves and especially to breaking up bundles of tobacco leaves. As a preliminary to drying, it is customary, in some tobacco fields at least to gather the green leaves into bundles with their stems twisted or tied together. My invention relates to re-separating the leaves of such bundles. Heretofore this work has been done largely, if not entirely by hand; my present invention provides a novel method for doing the work and also provides for doing the work by machine.

Such machines are particularly useful as feeds for machines which strip the stems or larger veins from the bodies of tobacco leaves, and the embodiment of my invention hereinafter described has been specially arranged for such use. It will be apparent however that the machine may be used to re-separate leaves as a preliminary to any other step of manufacturing or mechandising.

Figure 1:
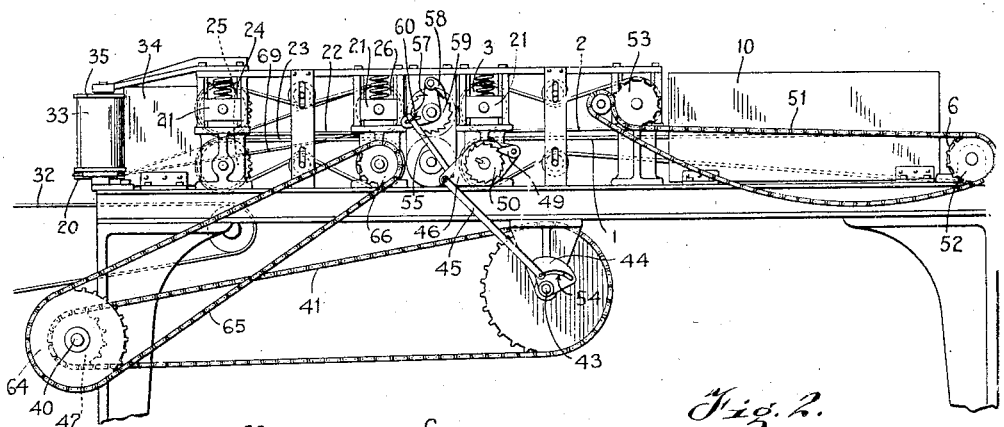
Figure 2:
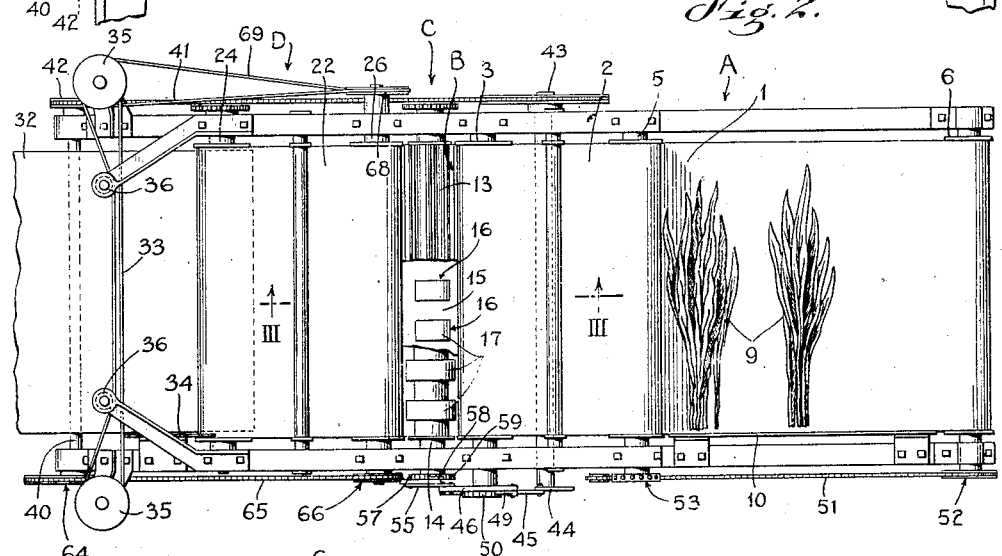
Figure 3:
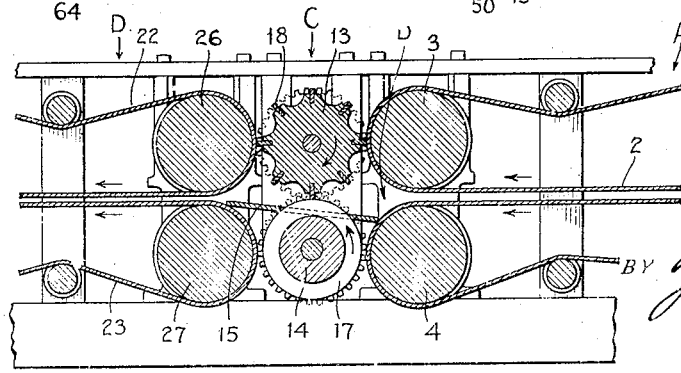

The accompanying drawings illustrate an embodiment of my invention that is particularly adapted to act as a feed for stemming machines as aforesaid. Fig. 1 is an elevation of the machine; Fig. 2 is a plan view thereof, and Fig. 3 is a sectional detail of a part thereof.

In the operation of my invention, the twine or other wrapping of the stems of the bundles is first broken and each bundle crudely torn apart or separated into distinct parts—for example by hand—but without any attempt being made to separate the bundle into its individual leaves as heretofore. This rough, uneven breaking of the bundles causes the leaves to project irregularly from the resulting leaf-masses and in this condition the masses are fed to the machine intake A which advances the leaf masses successively through a gripping mechanism at B, wherein each mass is held firmly while a differently timed mechanism at C (which I term the separator mechanism) grasps each projecting bit of leaf as the latter is presented to the separator and that leaf is torn away from the part-bundle held in the gripping mechanism before a further advance of the mass presents a bit of another leaf to the grasp of the separator. This action being continuous and the separator mechanism at C continually carrying the leaves away faster (that is, at a greater speed) than the leaves are presented to it in the mass, each mass is ultimately broken up into its component parts. A transfer mechanism D conveys away the separated leaves form C, and if this transfer is driven at a higher speed than C, the leaves are spaced apart still farther. In this manner the leaves may be separated from each other to such farther extent as may be desirable for subsequent operations. Beyond the high speed transfer D, the machine shown has been provided with special appliances adapting it for use as a feeding mechanism for stemming machines and these are described in detail hereinafter.

In the embodiment of the invention illustrated, intake A comprises the parallel flexible belts 1 and 2, which, in passing around the pulleys or rolls 3 and 4, also provide the gripping mechanism. Other pulleys 5 and 6 and such idlers as may be necessary, complete the support of these belts and the latter travel at substantially the same speed and in opposite directions so that the two adjacent courses of the belts move in the same direction, that it to say, both toward the gripper B. The width of these belts slightly exceeds the length of the longest leaf contemplated and the lower belt 1 is extended beyond the upper belt 2 at the entrance end of the mechine so as to provide a space on which the operator may place the broken bundles 9 in succession as shown in Fig. 2. A vertical wall plate 10 at one edge of the extension of the lower belt provides a guide against or close to which the operator may place the stem ends of the broken bunches as indicated and thus secure substantially uniform introduction of the leaf masses. The intake belts advance short distances intermittently, step by step. These advances ultimately carry successive broken leaf-masses to B where the pulleys or drums 3 and 4 are placed so close together that the belts hold each mass firmly, with a portion protruding within the reach of the separator C, during the intervals that the belts are at rest. During these intervals the mechanism at C grasps the protruding bit or bits of the mass and pulls the same away from the remainder of the mass retained by the belts. The separator mechanism C consists principally of the corrugated roller 13 and a suitable cooperating support begrasped. Preferably this support comprises a second roller 14 turning synchronously with the corrugated roller 13 and contacting, or substantially contacting, with the corrugations of the latter. A table or plate 15 may be inserted to assist in directing the leaves into the crevice between the rollers of the separator, and from the crevice to the transfer D; preferably this table is continuous, in part at least, from one side of the roller 13 to the other. In the present instance the plate is provided with a number of apertures 16 through which sections 17 of the lower roller project into contact with the corrugated separator roller while bridges between the apertures extend over reduced sections of the lower roller to connect the two sides of the plate table 15. A stationary table may constitute more or less of the coacting support below the currugated roller 13 in the present instance for example, by the bridges of the plate table 15 being placed high enough to engage or substantially engage with these corrugations. Preferably (Fig. 3) at least the edges of the longitudinal corrugations of the upper roller consist of a flexible material like rubber whereby these corrugations may actually engage with and somewhat press against the co-acting support or supports below to grasp a leaf sufficiently firmly to assure the leaf being pulled away from the leaf mass, but without however unduly crushing the leaf; the corrugations may consist, for example, in part or in whole of rubber strips 18 set in slots in the roller body 13. The corrugations may also be set to contact with the belt 2 where the latter passes over the roller 3 (Fig. 3) and thus prevent leaves following this belt upwards by chance and out of the reach of the separator members; the table plate 15 may also be inclined as shown in the same figure and brought near the lower belt to prevent the leaves from following this belt down. The two separator rollers 13 and 14 are turned intermittently like the belts 1 and 2 (in the direction to convey the leaves away from the belts 1 and 2), but are so driven as, in general, to turn while the intake belts are at rest and to stand at rest while these belts advance.

It will now be apparent that the step-by-step advances of the intake belts 1 and 2 being sufficiently short, repeated advances will bring the projecting bits of each torn leaf-mass within the reach of the separators at C successively as aforesaid. These rolls turning while the intake belts are at rest, the separator grasps these separate bits of leaf during the intervals wherein the mass is held at rest by the belts and pulls the grasped leaf or leaves away and passes them on to the transfer D. Ultimately the entire mass is pulled apart in this manner and the action is repeated on successive masses. The length of the belt-steps (that is, the distance they advance the mass in each forward step) will, of course, be so adjusted as to bring about the desired leaf-introduction to the separator rolls. It is intended that the length of the steps shall be such that only one leaf at a time is brought within the grasp of the separator C; should the steps be longer, or the bundles so crudely opened as to cause more than one leaf at a time to be presented to the separator, two or more leaves will be torn away from the constituent mass together. There may be some overlapping in the alternate advance of the intake belts and the turning of the separator rolls as will now be apparent.

The transfer at D consists, in the present instance, of two flexible belts 22 and 23 running over suitable pulleys or rolls 24, 25, 26 and 27, and provided with such idlers as may be necessary or desired; these belts are of the same width as the intake belts 1 and 2 and are driven in opposite directions so that they coact to convey the leaves away from the separator rolls at C. As before pointed out, these belts may be driven so much faster than the separator rolls as to space the separated leaves apart a greater distance than is effected by the separator rolls alone. The belt-supporting rolls 26 and 27 which are adjacent the separator mechanism at C, are located sufficiently close to each other to cause the transfer belts to grasp the leaves rather tightly at this point so as to assist or complete the separation of the leaves if necessary, as by conveying away the more advanced leaf of a pair (and therefore the first of the pair released by the separator C) that by chance may have come together within the reach of the separator rolls and hence have been torn from a leaf-mass together. The more rearward of these two leaves remains within the separator rolls pending its release by a further turn of the rolls. As shown, particularly in Fig. 1, the belts 22 and 23 preferably diverge slightly toward the exit where the separated leaves are discharged.

As before stated, the machine is herein illustrated as arranged for use as a feed for a stemming machine. The special appliances for this purpose consist of a feed belt 32 for conveying the separated leaves to the stemmer, and a cross belt 33 and a vertical abutment plate 34 beside the feed belt for aligning the leaves on this feed belt in the manner that a stemmer requires. On account of the irregular placing of the leaves in the bundles and the treatment they receive in the process of separation, the leaves are discharged from the transfer belts 22 and 23 with the ends of their stems at varying distances from the adjacent edge of the transfer belt; furthermore, the transfer belts are (or may be) driven at such high speed as to throw the leaves some distance from the exit between them. I take advantage of this last feature to align the leaf stems at or near the edge of the feed belt 32 as is required by the stemmer. For this purpose the vertical cross belt 33 is placed opposite the exit from the transfer belts and within the trajectory of the issuing leaves. This cross belt is driven continuously in such a direction that the course of the belt opposite the transfer exit moves toward the abutment plate 34. The leaves therefore strike this belt and are thrown by it toward the abutment plate, stem first, and striking it fall onto the feed belt substantially parallel with each other and with the ends of their stems substantially in line. The feed belt then conveys the aligned leaves underneath the cross belt and on to the stemmer or other point of further treatment. The cross belt is carried by the vertical pulleys or rollers 35; if desired, the idlers 36 may deflect the cross belt as shown to provide additional room for the machine (not shown) performing the further treatment.

It will be understood that the various parts of the machine will be of such sizes and so proportioned as to perform the functions indicated. I have found about three inches to be a suitable diameter for the rolls supporting the intake and transfer belts, and for the separator rolls 13 and 14. I also usually space the two intake belts about one-quarter of an inch apart and separate the two transfer belts about the same distance. It will also be understood that various forms of mechanical movements may, in general, be employed for securing the actions of the belts and rolls heretofore described. In the machine illustrated power is derived from the power shaft 40 which turns continually in one direction. A chain 41 between the sprocket 42 on the power shaft 40 drives the jack shaft 43, and a short crank 44 on the latter is connected by a link 45 to a rocker 46 loosely hung on the shaft of the belt-supporting roller 4; thence a spring held pawl 49 on the rocker 46 co-acts with a ratchet 50 keyed to the shaft of the roller 4 to drive the belt 1, and a chain 51 between the sprockets 52 and 53 (respectively fixed on the shafts of rollers 5 and 6) drives the upper belt 2 from the lower belt 1 at the same speed. As a result of this mechanism each turn of the jack shaft 43 causes the intake belts to move forward one step; the length of the step (that is, the distance the leaf masses are fed forward by each turn of the jack shaft as before explained), is of course determined by the length of the various crank and lever arms and the angle spanned by each tooth of the ratchet 50. For the purpose of adjusting this feed the crank 44 may comprise a plate having an eccentric slot 54 within which the end of the connecting rod 45 is adjustable. A second connecting rod 55 reaches from the rocker 46 to a bell crank 57 swinging on the shaft of the corrugated separator roller 13 and the opposite arm of this lever carries the pawl 58 co-acting with the ratchet 59 keyed to the roller shaft so that this roller is also advanced a step with each turn of the jack shaft. The connecting rod 55 is connected to the rocker 46 at the opposite side of the roller shaft 4 from the pawl 49 however, and thereby the separator mechanism is made to advance, grasp and pull on the leaf as before described, while the leaf mass is held stationary by the intake belts. The slot 60 within which the end of the connecting rod 55 is adjustable provides for the separate adjustment of the advance or length of step of the separator rollers. The lower separator roller 14 is geared to the corrugated roller as shown particularly in Figure 3, so as to turn with and at the same rate of speed as the corrugated roller. The transfer belts 22 and 23 are driven directly and continuously from the power shaft 40; a second sprocket 64 on this shaft is connected by a chain 65 with a sprocket 66 keyed to the shaft of the transfer belt roller 27 and the opposite roller 28 of the same belt is geared to the roller 24 immediately above it to drive the upper transfer belt at the same speed that the lower transfer belt is driven. I prefer the positive type of drive, such as secured by sprockets and chains, gears and pawls and ratchets, especially for the intermittently operated parts for thereby accurate timing of the mechanism. The cross belt 33 is driven by means of the light belt 69 connecting the pulley 68 on the shaft of the roller 26 to a pulley 70 built on the lower end of one of the supporting rollers 35 of the cross-belt as shown. The feed belt 32 may be of the usual feed belt of the stemming machine and be driven thereby. The journal boxes 71 of the upper rollers 3, 5, 24 and 26 of the intake and transfer belts may be mounted to slide in vertical guides and may be spring-pressed downwardly as shown. Although not necessary, this is a preferable arrangement, especially for the rollers 3 and 26 at the two sides of the separator mechanism in order that, without crushing the leaves, the leaves may be grasped firmly at these points as aforesaid. The whole arrangement may be mounted in any suitable framing or foundation.

It will be understood that the invention is not limited to the specific embodiment above described but may be embodied in divers forms as appears from the foregoing.

Claims.

1. In a machine for separating bunched tobacco leaves and the like, the combination of a separator mechanism for grasping a leaf, and mechanism for presenting a leaf-bunch to said separator mechanism, said two mechanisms being differently timed so that a leaf grasped by the separator mechanism is separated from the remaining leaves of the bunch and the continued operation of said mechanisms breaks up the bunch.

2. In a machine for separating bunched tobacco leaves and the like, the combination of mechanism for grasping leaves, and mechanism for presenting a leaf-bunch to the first mentioned mechanism so that the latter grasps the leaves successively, said mechanisms withdrawing the remainder of the leaf-bunch relative to the part of the bunch grasped by the first mentioned mechanism so that the grasped part is removed from the bunch, the continued actions of said mechanisms separating the bunch into parts.

3. In a machine for separating bunched tobacco leaves and the like, the combination of mechanism through which a bunch of leaves is advanced and which intermittently hold the bunch at rest, and intermittently operating mechanism for grasping a part of the bunch and advancing said part, the second mentioned mechanism acting while the first mentioned mechanism holds the leaf-bunch at rest so that repeated operations of said mechanisms separates the bunch into parts.

4. In a machine for separating bunched tobacco leaves and the like, the combination of mechanism for grasping leaves, mechanism for presenting a leaf-bunch to the first mentioned mechanism so that the latter grasps the leaves successively, said mechanisms withdrawing the remainder of the leaf-bunch relative to the part of the bunch grasped by the first mentioned mechanism to remove the grasped part from the bunch, so that the continued actions of said mechanisms separates the bunch into parts, and a transfer conveying the separate parts away at a greater rate of speed.

5. In a machine for separating bunched tobacco leaves and the like, the combination of a pair of coacting intake belts to advance the leaf masses successively, a separator roller at the delivery end of the intake belts, and a support cooperating with the separator roller, said separator roller and support cooperating to grasp projecting bits of the leaf masses and carry the leaves away faster than the belts advance the masses to the grasp of the separator.

6. The combination of claim 5 in which, further, the separator roller is corrugated longitudinally, the edge of the corrugations coacting with the said support to carry away the leaves.

7. The combination of claim 5 in which, further, the separator roll is corrugated longitudinally and the edges of the corrugations are flexible and engage with the support.

8. The combination of claim 5 in which, further, the said support includes a roller turning synchronously with the said separator roller.

9. In a machine for separating bunched tobacco leaves and the like, the combination of a pair of co-acting belts to advance the leaf masses successively, a separator roller at the delivery end of the intake belts, a roller support turning synchronously with the separator roller, said roller support comprising alternately large and small sections, and a table reaching from the intake belts to the crevice between the said rollers, the table being provided with apertures through which the said large sections of the roller support project into cooperation with the separator roll.

10. The subject of claim 5 in which the separator roll is corrugated longitudinally and the edges of the corrugations are flexible and engaged with the support, in combination with a transfer to take the leaves away from the separator roller, said transfer removing the leaves at a higher rate of speed than the separator roller removes them from the intake belts.

11. In a machine for separating bunched tobacco leaves and the like, the combination of a pair of intermittently operating co-acting intake belts to advance the leaf masses successively, an intermittently operating separator roller at the delivery end of the intake belt and a cooperating supporting means, said belts and roller advancing substantially alternately so that the roller grasps a portion of a leaf projecting from a mass held by the intake belts and pulls that leaf away from the mass while the mass is held stationary by the belt and continued intermittent operations of the belts and roller separates the respective leaf masses into parts.

12. In a machine for separating bunched tobacco leaves and the like, the combination of mechanisms to separate the respective bunches into parts, a cross belt against which the separated parts are thrown, and an abutment against which the cross belt thrusts the parts successively, thereby aligning the leaves.

13. In a machine for separating bunched tobacco leaves and the like, the combination of a pair of flexible co-acting intake belts, a corrugated separator roller at the delivery end of the intake belts, a roller support cooperating with the corrugated roller and turning synchronously therewith, said belts and the rollers advancing the leaves intermittently and substantially alternately so that a leaf projecting from a mass held by the belts and within the grasp of the rollers is pulled away from the leaf-mass, and a pair of co-acting belts taking the leaves from said rollers.

14. The method of breaking up bundles of dry tobacco leaves of the kind described, which consists of crudely tearing the bundles apart so that the resulting masses consist of loosely attached leaves and from which masses leaves project irregularly, standing out in part separated from other leaves, holding the masses successively while successively presenting the projecting leaves of each mass in a position to be grasped, grasping the projecting leaves successively, and causing the mass and the thing grasping the projecting leaves to be withdrawn relatively with each other to pull each grasped part from the remainder of the mass before another projecting part of the mass is grasped.

15. In a machine for separating bunched tobacco leaves and the like, the combination of mechanism for holding a mass of loosely attached leaves from which parts project irregularly and in part stand separated from other parts of the mass, said mechanism being adapted to hold and retain the remaining main portion of the mass as each projecting part is pulled away therefrom and to present successively the projecting parts of the mass to the mechanism hereinafter mentioned, and a mechanism to grasp each projecting part of the mass and completely separate the said grasped part of the mass from the remainder thereof, said mechanism operating successively on different portions of the mass and thereby breaking up the mass into its component parts.

In testimony whereof, I have signed this specification.

JOSEPH GOUGH.